United States Patent
Bono

(10) Patent No.: US 9,571,557 B2
(45) Date of Patent: Feb. 14, 2017

(54) SCRIPT CACHING METHOD AND INFORMATION PROCESSING DEVICE UTILIZING THE SAME

(71) Applicant: DeNA Co., Ltd., Tokyo (JP)

(72) Inventor: Hironori Bono, Tokyo (JP)

(73) Assignee: DeNA Co., Ltd., Tokyo (JP)

(\*) Notice: Subject to any disclaimer, the term of this patent is extended or adjusted under 35 U.S.C. 154(b) by 65 days.

(21) Appl. No.: 14/755,159

(22) Filed: Jun. 30, 2015

(65) Prior Publication Data

US 2016/0004782 A1 Jan. 7, 2016

(30) Foreign Application Priority Data

Jul. 4, 2014 (JP) ................................ 2014-138438

(51) Int. Cl.
| | | |
|---|---|---|
| *G06F 9/45* | (2006.01) | |
| *H04L 29/08* | (2006.01) | |
| *G06F 17/30* | (2006.01) | |
| *G06F 9/50* | (2006.01) | |
| *G06F 9/445* | (2006.01) | |

(52) U.S. Cl.
CPC ............... *H04L 67/02* (2013.01); *G06F 9/50* (2013.01); *G06F 17/3089* (2013.01); *H04L 67/2842* (2013.01); *G06F 9/44521* (2013.01)

(58) Field of Classification Search
None
See application file for complete search history.

(56) References Cited

U.S. PATENT DOCUMENTS

| | | | | |
|---|---|---|---|---|
| 6,336,213 | B1* | 1/2002 | Beadle | G06F 9/45516 717/118 |
| 6,951,014 | B1* | 9/2005 | Sokolov | G06F 9/45508 717/139 |
| 8,683,454 | B1* | 3/2014 | Muggli | G06F 8/4435 717/159 |
| 9,372,688 | B1* | 6/2016 | Ben-Yair | G06F 8/71 |
| 2007/0198600 | A1* | 8/2007 | Betz | G06F 17/30533 |
| 2014/0053089 | A1* | 2/2014 | von Bochmann | G06F 3/0484 715/760 |
| 2016/0299745 | A1* | 10/2016 | Zhang | G06F 9/45529 |

FOREIGN PATENT DOCUMENTS

| | | |
|---|---|---|
| JP | 2012-059060 | 3/2012 |
| JP | 5231500 | 3/2012 |
| JP | 2012-221483 | 11/2012 |
| JP | 2013-516720 | 5/2013 |

OTHER PUBLICATIONS

Japanese Patent Application No. 2014-138438:Decision to Grant mailed on Aug. 4, 2014.

\* cited by examiner

*Primary Examiner* — Philip Wang
(74) *Attorney, Agent, or Firm* — Procopio, Cory, Hargreaves & Savitch LLP

(57) ABSTRACT

In the event that function names contained when one of the scripts describing objects processed within each predetermined processing unit in the web application is defined as a script of interest and the script of interest is converted to internal code are not common with function names contained when the scripts describing the remaining objects are converted to internal code, the internal code of said script of interest is cached.

3 Claims, 8 Drawing Sheets

```
var n = {};
function traverse(objects, path, data) {
  var length = objects.length;
  var object = objects[length - 1];
  for (var key in object) {
    var value = object[key];
    var type = typeof value;
    var name = path + '.' + key;
    if (value == null) {
      continue;
    }
    if (type == 'object') {
      if (isSystemObject(value)) {
        continue;
      }
      if (value instanceof Array) {
        data.push({ 'key': name, 'value': value });
        continue;
      } else {
        var loop = false;
        for (var i = 0; i < length; ++i) {
          if (objects[i] === value) {
            loop = true;
            break;
          }
        }
        if (!loop) {
          objects.push(value);
          traverse(objects, name, data);
          objects.pop();
        }
      }
    } else if (type != 'undefined') {
      data.push({ 'key': name, 'value': value });
    }
  }
};

var data = [];
traverse([n], 'n' , data);
```

FIG.5

```
var data0 = [];
traverse([n], 'n', data0);
// data0 = [
//    {
//        'key': 'n.MyClass1',
//        'value': function klass() {...}
//    },
//    {
//        'key': 'n.MyClass2',
//        'value': function klass() {...}
//    },
//    {
//        'key': 'n.myData.scene',
//        'value': 1
//    },
//    {
//        'key': 'n.myData.enemy',
//        'value': []
//    },
//    ...
// ];
```

FIG.6

```
var n = {};
n.MyClass1 = Class.create({
   value: 0,
   init: function(value) {
      this.value = value;
   }
});

var n = {};
n.MyClass2 = Class.create({
   value: 0,
   init: function(value) {
      this.value = value;
   }
});
```

FIG.7

```
var n = {};
(function() {
n.MyClass1 = function klass(value) {
   this.init.apply(this, arguments);
};
n.MyClass1.prototype.value = 0;
n.MyClass1.prototype.init =
     function(value) {
   this.value = value;
};
})();

var n = {};
(function() {
n.MyClass2 = function klass(value) {
   this.init.apply(this, arguments);
};
n.MyClass2.prototype.value = 0;
n.MyClass2.prototype.init =
     function(value) {
   this.value = value;
};
})();
```

FIG.8

SCRIPT CACHING METHOD AND INFORMATION PROCESSING DEVICE UTILIZING THE SAME

The present application claims the benefit of Japanese Patent Application No. JP2014-138438, filed on Jul. 4, 2014, the contents of which is incorporated herein in its entirety by reference.

BACKGROUND

1. Technical Field

The present invention relates to a method of script caching in web applications and an information processing device utilizing the same.

2. Related Art

Systems have been employed in which a scripted web application is downloaded from a server and a client analyzes and executes the script. In such systems, it is necessary to download the script used to write the application by connecting the client to the Internet or another network, which can increase the communications load on the network. In addition, it is necessary for the client to analyze the script each time it is downloaded, which can increase the client's processing burden.

Thus, a script caching technology has been disclosed in which a management script is embedded in an HTML file of a web page, and, if an executable script is present in the client's storage area when the web page is loaded, it is read from said storage area and executed. Otherwise, a script is acquired from a server and executed (Patent Citation 1).

PRIOR-ART DOCUMENT

Patent Citation

[Patent Citation 1] Japanese Patent Publication No. 5,231,500

It should be noted that while script caching techniques are capable of easing the client's processing burden and the communications load on the network during downloads, they cannot ease the client's burden of script analysis.

SUMMARY

It is an object of the present invention to provide a script caching method and an information processing device utilizing the same that make it possible to alleviate the burden of processing of scripted web applications.

One aspect of the present invention provides for a script caching method wherein, in a web application, whose functionality is at least partially scripted, in the event that, for each predetermined processing unit in the web application, function names contained in internal code (e.g., non-transitory computer readable media having machine-executable instructions to operate a computer having a storage and a hardware processor connected via a network to a terminal device) when one of the scripts describing objects processed within said processing unit is defined as a script of interest and said script of interest is converted to internal code are not common with function names contained in internal code when the scripts describing the remaining objects processed within said processing unit are converted to internal code, the internal code of said script of interest is cached.

Another aspect of the present invention provides for an information processing device which, in a web application, whose functionality is at least partially scripted, in the event that, for each predetermined processing unit in the web application, function names contained in internal code when one of the scripts describing objects processed within said processing unit is defined as a script of interest and said script of interest is converted to internal code are not common with function names contained in internal code when the scripts describing the remaining objects processed within said processing unit are converted to internal code, the internal code of said script of interest is cached.

Here, the processing unit is preferably a web page unit displayed in a browser.

In addition, in the event that, for each processing unit, function names contained in internal code when a list of objects contained in said unit is generated and, by referring to the list, one of the scripts describing objects processed within said processing unit is defined as a script of interest and said script of interest is converted to internal code are not common with function names contained in internal code when the scripts describing the remaining objects processed within said processing unit are converted to internal code, the internal code of the script of interest is preferably cached.

Effects of the Invention

In accordance with the present invention, the burden of processing of scripted web applications can be alleviated.

BRIEF DESCRIPTION OF THE DRAWINGS

FIG. 5 A diagram illustrating an exemplary software program used to create a list of objects in an embodiment of the present invention.

FIG. 6 A diagram illustrating an exemplary list of objects used in an embodiment of the present invention.

FIG. 7 A diagram illustrating exemplary scripted objects (list) used in an embodiment of the present invention.

FIG. 8 A diagram illustrating exemplary objects (list) converted to internal code in an embodiment of the present invention.

DETAILED DESCRIPTION

<Configuration of Information Processing System>

Figure 1:
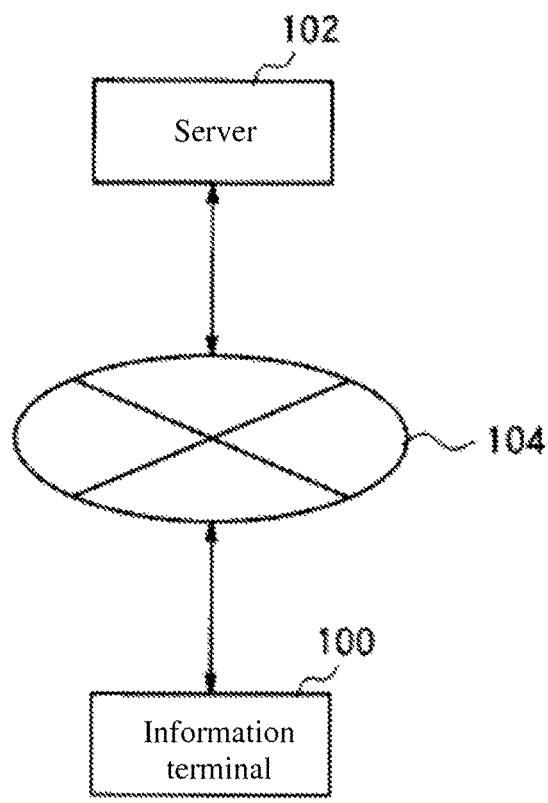
FIG. 1 A diagram illustrating the configuration of an information processing system used in an embodiment of the present invention.

As shown in FIG. 1, the information processing system used in an embodiment of the present invention includes information terminals 100 and a server 102. The server 102 is connected to the information terminals 100 so as to enable communication via an information communication network 104, such as the Internet or the like. The server 102 is accessed by the information terminals 100 and transmits a web application to the information terminals 100. Upon receiving the web application from the server 102, the information terminals 100 analyze and execute said web application.

Figure 2:
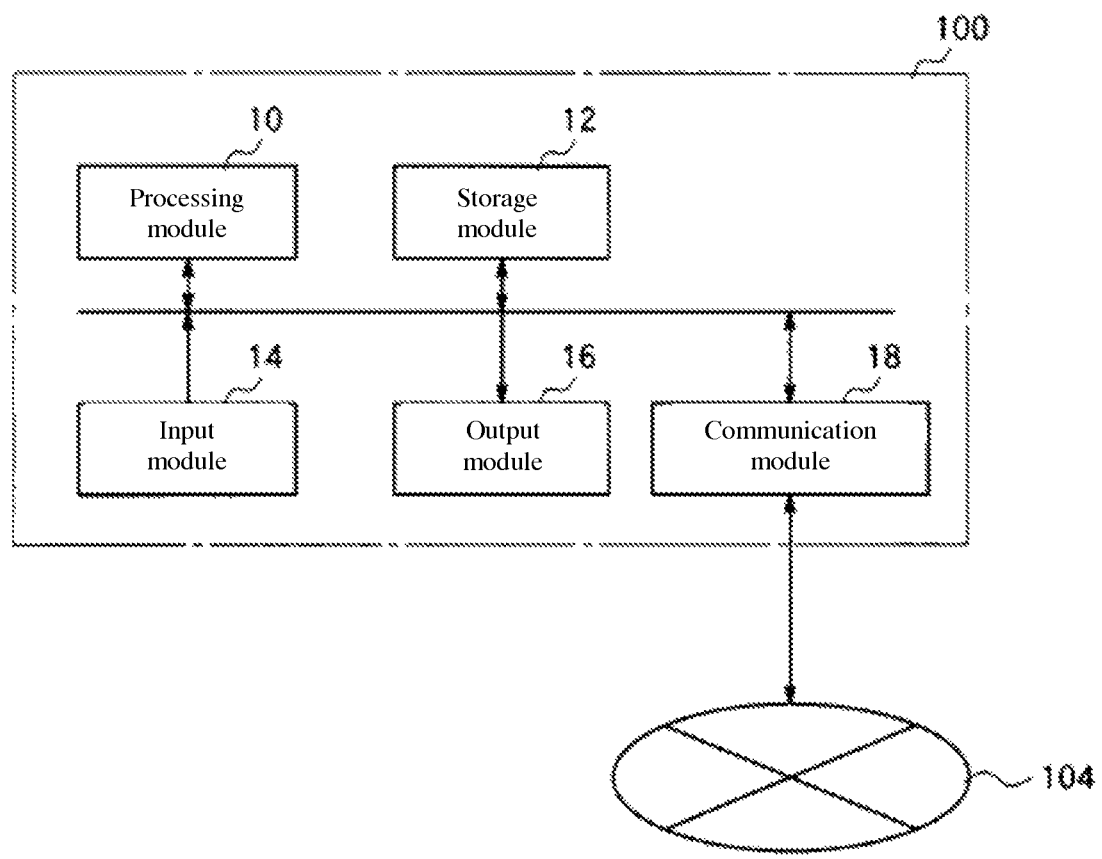
FIG. 2 A diagram illustrating the configuration of an information terminal in an embodiment of the present invention.

As shown in FIG. 2, an information terminal 100 includes a processing module 10, a storage module 12, an input module 14, an output module 16, and a communication module 18. The basic configuration of the information terminals 100 is that of a communication-enabled mobile terminal, such as a mobile phone, a smartphone, a tablet terminal, or the like.

The processing module 10 includes means for performing arithmetic processing, such as a CPU or the like. The processing module 10 executes the web application program. The web application is downloaded from the server 102. The storage module 12 includes storage means, such as a semiconductor memory, a memory card, and so forth. The storage module 12 is accessibly connected to the processing module 10 and stores the web application, data required for its processing, and other information. The input module 14 includes means for entering information into the information terminal 100. The input module 14 has, for example, a touchscreen panel or buttons for accepting input from the user. The output module 16 includes a user interface screen (UI) or the like for accepting input information from the user and means for outputting the results of processing from the information terminal 100. The output module 16 is provided with a display that, for example, presents images to the user. The communication module 18 includes an interface for exchanging information with other information communication devices via the information communication network 104. The communication module 18 may be wired or wireless.

Figure 3:
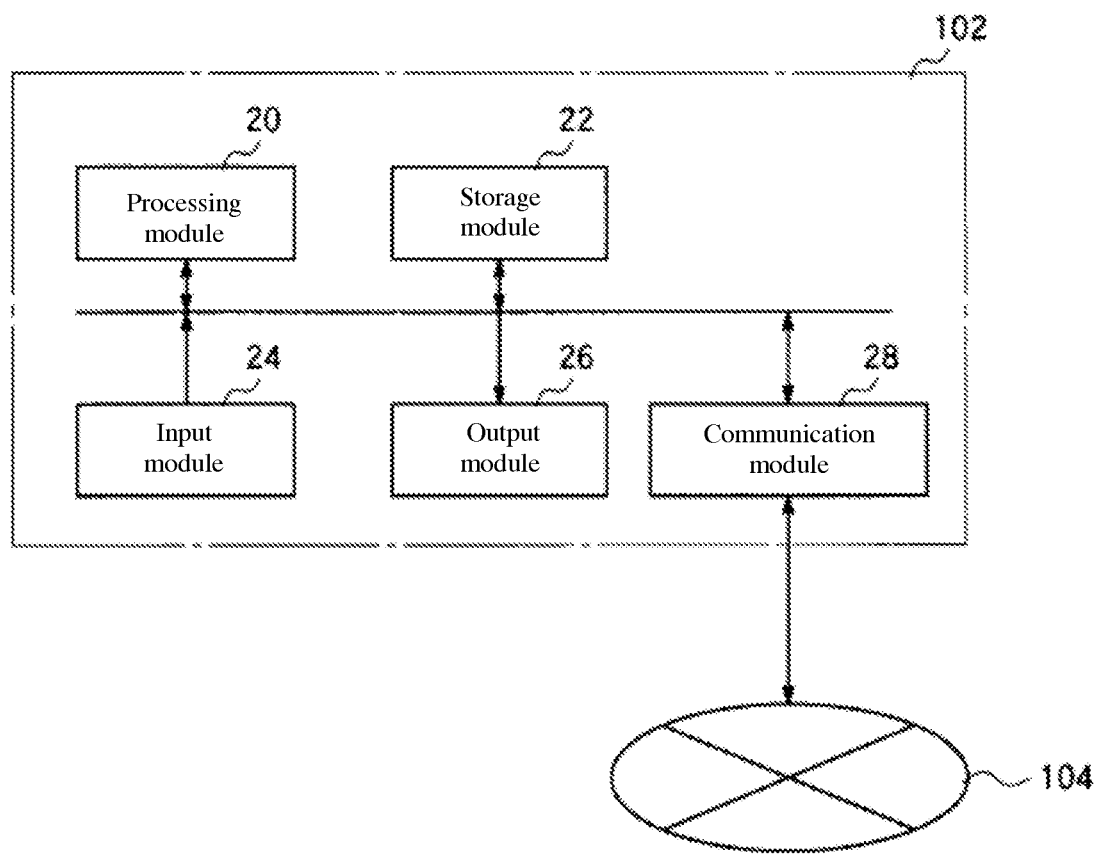
FIG. 3 A diagram illustrating the configuration of a server in an embodiment of the present invention.

As shown in FIG. 3, the server 102 includes a processing module 20, a storage module 22, an input module 24, an output module 26, and a communication module 28. The basic configuration of the server 102 is that of a computer with communication capabilities.

The processing module 20 includes means for performing arithmetic processing, such as a CPU or the like. The processing module 20 allows access from an information terminal 100 and performs processing to provide the web application stored in the storage module 22 to the information terminal 100. The storage module 22 includes storage means, such as a semiconductor memory, a hard disk, and so forth. The storage module 22 is accessibly connected to the processing module 20 and stores the web application, data required for its processing, and other information. The input module 24 includes means for entering information into the server 102. The input module 24 has, for example, a keyboard or the like for receiving input from the user. The output module 26 includes a user interface screen (UI) or the like used for accepting input information from the user and means for outputting the results of processing from the server 102. The output module 26 is provided with a display that, for example, presents images to the user. The communication module 28 includes an interface for exchanging information with the information terminal 100 via the information communication network 104. The communication module 28 may be wired or wireless.

At least some of the web applications handled by the information processing system of this embodiment are scripted (e.g., non-transitory computer readable media having machine-executable instructions to operate a computer having a storage and a hardware processor connected via a network to a terminal device). "Script" is a type of computer programming language, and means a programming language that makes execution possible by interpreting source code while bypassing or automating steps such as conversion to a machine language or creation of executable files. JavaScript™ is suggested as an example of a script.

For example, programs written in script may be written directly as internal code in an application written in HTML or another markup language (e.g., non-transitory computer readable media having machine-executable instructions to operate a computer having a storage and a hardware processor connected via a network to a terminal device). In addition, programs written in script may be loaded from external files and executed using type attributes and scr attributes.

Various instructions may be written in script. The instructions that may be written include, for instance: instructions to save data held in the storage modules 12 of the information terminals 100 and data described in scripts; instructions to erase data stored in the storage modules 12 of the information terminals 100; instructions to display data stored in the storage modules 12 of the information terminals 100; instructions to transmit data to the server 102; instructions to execute the four basic arithmetic operations or text string operations and the like on data; instructions specifying where to acquire a script to be run and requiring execution of that script, and so on.

If the next script to be run is described in the application, the information terminal 100 acquires the script, interprets the instructions recorded therein, converts them to internal code, and executes them. In this manner, the web application operates by sequentially acquiring the subsequent scripts and consecutively interpreting and executing the instructions described therein. The service provider holds the scripted web application on the server 102 and provides a service to users by informing the users of the address (URL) where the web application is provided.

<Script Caching Method>

Figure 4:
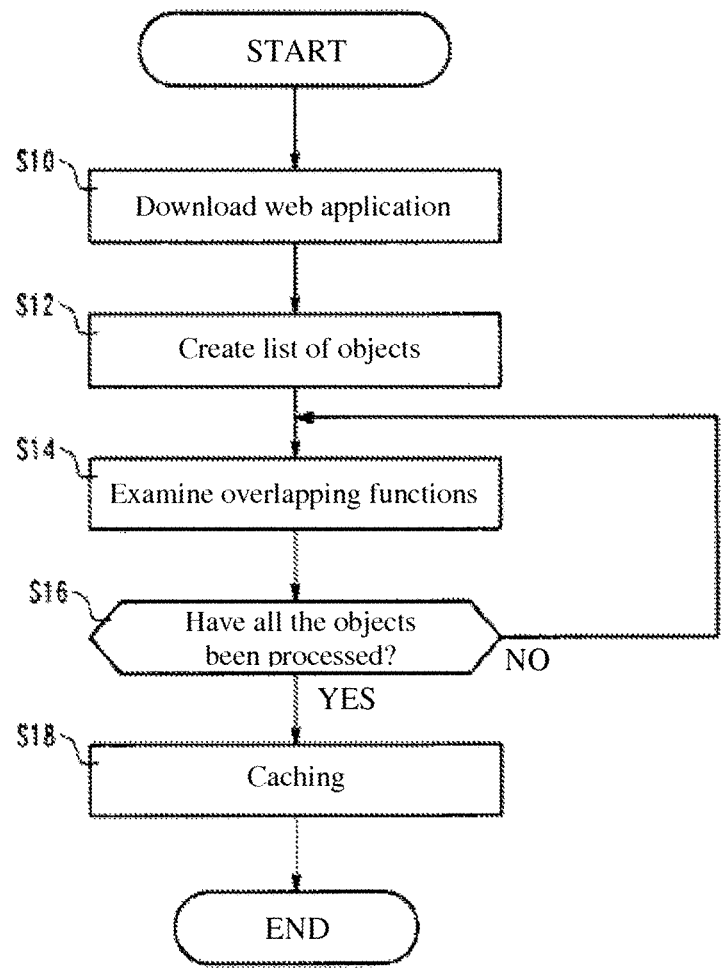
FIG. 4 A flow chart illustrating a script caching method used in an embodiment of the present invention.

This embodiment will be described with reference to an example in which an information terminal 100 accesses the server 102 and a web application is downloaded from the server 102 and executed in the information terminal 100. The script caching process performed by the information terminal 100 will be illustrated below with reference to the flow chart of FIG. 4.

The web application is downloaded at Step S10. As a result of processing in this step, the information terminal 100 operates as an application-acquiring means and the server 102 operates as an application-providing means. The user accesses the server 102 that provides the web application using an address (URL) intended for acquiring the web application with the help of a web browser on the information terminal 100. As a result, the web application is transmitted from the server 102 to the information terminal 100. The information terminal 100 receives the web application and stores the received application in the storage module 12.

It should be noted that in electronic games and other web applications executed in the browser, processing is often performed using a web page as a processing unit. In such cases the application may be transmitted in web page units and the processing shown below may be applied.

A list of the objects contained in the web application is created at Step S12. As a result of processing in this step, the information terminal 100 operates as a list creation means. The information terminal 100 carries out processing to generate a list of the objects contained in the web application acquired at Step S10.

In JavaScript™ and other scripts, a class is normally handled as one of the objects and all the global objects are managed in a tree structure. A program such as the one shown in FIG. 5 is then executed, thereby making it possible to output all the objects except for known system objects in the form of a list, as shown in FIG. 6. Values obtained by converting the keys of the objects and every object to the internal code executed in the information terminal 100 are included in the list.

The processing module 10 reads out the script of each object from the web application subject to processing, analyzes it using a script engine, and converts it to the internal code executed in the information terminal 100. For example, assuming that the classes "n.MyClass1" and "n.MyClass2" included in the list illustrated in FIG. 6 are described by the scripts illustrated in FIG. 7, when they are executed in the information terminal 100, they are analyzed by the script engine and converted to the internal code illustrated in FIG. 8. From this internal code, class names are extracted as keys, and functions are extracted as values. For "n.MyClass1" and "n.MyClass2", the resultant keys are "nMyClass1" and "nMyClass2" and all the values are "function klass".

At Step S14 it is determined whether or not scripts sharing the same internal code function names are present in the web application. As a result of processing in this step, the information terminal 100 operates as a common function examining means. The processing module 10 designates one of the objects listed at Step S12 as a script of interest. It is then determined whether or not the value of the script of interest is a function. Furthermore, if the value of the script of interest is a function, it is determined whether or not the same function as the value of the script of interest is present in the values of the other objects in the list.

At Step S16, it is determined whether or not all the objects in the list have been processed as scripts of interest. If not all of the objects have been processed as scripts of interest, the process goes back to Step S14, and if all the objects have already been processed as scripts of interest, the process advances to Step S18.

At Step S18 the web application is cached. As a result of processing in this step, the information terminal 100 operates as a caching means. The processing module 10 caches the web application subject to processing in a storage area reserved as a web caching area in the storage module 12. At such time, objects (classes) assumed to have common internal code function names in Step S14 are not converted to internal code and objects (classes) assumed to have no common function names are converted to internal code and cached.

In this manner, as a result of caching the web application, when the same web application is used again, it can be read from the caching area and used. Therefore, the communications load on the network due to downloads and the burden of processing on the information terminal 100 (client) can be alleviated.

In addition, the burden of script analysis on the information terminal 100 (client) can be alleviated. Here, if common function names in the internal code are shared by multiple objects (classes), when calls to the functions represented by said function names are made, execution needs to proceed by contextually interpreting whether the function of any object (class) has been called. In this embodiment, however, such trouble can be avoided because objects sharing common function names are cached without conversion to internal code.

It should be noted that some of the processing of the information terminal 100 may be done on the server 102. For example, some of the processing of Steps S12 to S16 may be done on the server 102.

DESCRIPTION OF REFERENCE NUMERALS

10. Processing module
12. Storage module
14. Input module
16. Output module
18. Communication module
20. Processing module
22. Storage module
24. Input module
26. Output module
28. Communication module
100. Information terminal
102. Server
104. Information communication network

The invention claimed is:

1. A script caching method wherein,
for a web application, having functionality at least partially scripted by scripts associated with objects generated in a list of objects, the scripts being processed in a predetermined processing unit that includes internal code comprising a non-transitory computer readable media having machine-executable instructions, to operate a computer having a storage and a hardware processor connected via a network to a terminal device,
in the event that, one of the scripts processed by the predetermined processing unit is defined as a script of interest associated with one of the objects in the list, and the script of interest is converted to the internal code and does not have an internal code function name that is common with function names contained in the internal code for ones of the scripts associated with objects not associated with the script of interest are converted to the internal code,
the internal code of the script of interest is cached.

2. The script caching method according to claim 1, wherein the predetermined processing unit is a web page unit displayed in a browser.

3. An information processing device wherein,
for a web application, having functionality at least partially scripted by scripts associated with objects generated in a list of objects, the scripts being processed in a predetermined processing unit that includes internal code comprising a non-transitory computer readable media having machine-executable instructions, to operate a computer having a storage and a hardware processor connected via a network to a terminal device,
in the event that, one of the scripts processed by the predetermined processing unit is defined as a script of interest associated with one of the objects in the list, and the script of interest is converted to the internal code and does not have an internal code function name that is common with function names contained in the internal code for ones of the scripts associated with objects not associated with the script of interest are converted to the internal code,
the internal code of the script of interest is cached.

* * * * *